(12) United States Patent
Cho

(10) Patent No.: US 10,198,081 B2
(45) Date of Patent: Feb. 5, 2019

(54) METHOD AND DEVICE FOR EXECUTING COMMAND ON BASIS OF CONTEXT AWARENESS

(71) Applicant: SK TELECOM CO., LTD., Seoul (KR)

(72) Inventor: Seunghyeon Cho, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 188 days.

(21) Appl. No.: 14/932,514

(22) Filed: Nov. 4, 2015

(65) Prior Publication Data

US 2016/0054808 A1    Feb. 25, 2016

Related U.S. Application Data

(63) Continuation of application No. PCT/KR2014/006845, filed on Jul. 25, 2014.

(30) Foreign Application Priority Data

Sep. 4, 2013  (KR) .................... 10-2013-0106190

(51) Int. Cl.
*G06F 3/01*        (2006.01)
*G06F 3/0484*      (2013.01)

(52) U.S. Cl.
CPC ............ *G06F 3/017* (2013.01); *G06F 3/0484* (2013.01)

(58) Field of Classification Search
CPC ...................................................... G06F 3/017
See application file for complete search history.

(56) References Cited

U.S. PATENT DOCUMENTS

2012/0017147 A1\* 1/2012 Mark ..................... G06F 1/1639
                                                      715/702
2014/0040756 A1\* 2/2014 Bukurak ................. G06F 3/017
                                                      715/741

(Continued)

FOREIGN PATENT DOCUMENTS

| CN | 102253709 A | 11/2011 |
| KR | 1020100052378 A | 5/2010 |
| KR | 1020100120958 A | 11/2010 |

(Continued)

OTHER PUBLICATIONS

International Search Report dated Nov. 18, 2014 for PCT/KR2014/006845.

(Continued)

*Primary Examiner* — Alexander Eisen
*Assistant Examiner* — Cory A Almeida
(74) *Attorney, Agent, or Firm* — Hauptman Ham, LLP

(57) ABSTRACT

A terminal device includes: a sensing unit to generate a motion change information by detecting motions of the terminal device and sensing a motion change of the terminal device; a gesture determiner to compare the motion change information with pre-specified gestures and generate a particular gesture information corresponding to the sensed motion change of the terminal device; an application controller to identify at least one activated application in an active state; and an execution unit to execute preset commands corresponding to the particular gesture information for respective activated applications.

11 Claims, 4 Drawing Sheets

(56) References Cited

U.S. PATENT DOCUMENTS

2014/0157209 A1* 6/2014 Dalal .................. G06F 3/017
　　　　　　　　　　　　　　　　　　　　　715/863
2014/0282272 A1* 9/2014 Kies .................. G06F 3/017
　　　　　　　　　　　　　　　　　　　　　715/863

FOREIGN PATENT DOCUMENTS

| KR | 1020110064044 A | 6/2011 |
| KR | 1020120128352 A | 2/2012 |
| KR | 1020120067495 A | 6/2012 |

OTHER PUBLICATIONS

Chinese Office Action dated Nov. 16, 2017 for corresponding Chines Application No. 201480023262.8.

* cited by examiner

METHOD AND DEVICE FOR EXECUTING COMMAND ON BASIS OF CONTEXT AWARENESS

CROSS-REFERENCE TO RELATED APPLICATIONS

The present application is a continuation of International Patent Application No. PCT/KR2014/006845, filed Jul. 25, 2014, which is based on and claims the benefit of priority to Korean Patent Application No. 10-2013-0106190, filed on Sep. 4, 2013. The disclosures of the above-listed applications are hereby incorporated by reference herein in their entirety.

TECHNICAL FIELD

The present embodiments relate to a method and a device for executing a command on the basis of context awareness.

BACKGROUND

The statements in this section merely provide background information related to the present embodiments and do not necessarily constitute prior art.

Recent dramatic developments in computers, electronics and communication technology have diversified electronic devices. A common input method for controlling various software applications in the electronic devices includes manual operation of physical input means, such as a touch-screen (panel) and a keypad to manipulate the screen on a display unit. In addition to the method, researches have been conducted on awareness of the user's operative movements.

The inventor(s) has noted that motion recognition apparatus provides means for recognizing the operator's finger movements as input. The inventor(s) has also noted that some applications for motion recognition provide a user interface (UI) with a particular gesture being exclusive to a particular function for execution. Such a UI allowing a one-to-one correspondence between gestures and functions is usually operative dedicated to certain application software. The inventor(s) has experienced that inconsistency of user's gestures leads to lower usability.

SUMMARY

In accordance with some embodiments of the present disclosure, a terminal comprise a sensing unit, a gesture determiner, an application controller and an execution unit. The sensing unit is configured to generate a motion change information by detecting motions of the terminal device and sensing a motion change of the terminal device. The gesture determiner is configured to compare the motion change information with pre-specified gestures and generate a particular gesture information corresponding to the sensed motion change of the terminal device. The application controller is configured to identify at least one activated application in an active state. And the execution unit is configured to execute preset commands corresponding to the particular gesture information for respective activated applications.

In accordance with some embodiments of the present disclosure, a non-transitory computer readable medium contains a program for executing a command on the basis of context awareness, and includes computer-executable instructions. The program causes, when executed by a data processor, the data processor to execute: determining a gesture by comparing a motion change information of a terminal device with pre-specified gestures to generate a particular gesture information; identifying at least one activated application in active state; and executing preset commands corresponding to the particular gesture information for respective activated applications.

In accordance with some embodiments of the present disclosure, a method performed by a terminal device for executing a command on the basis of context awareness. The method comprises: determining a gesture by comparing a motion change information of the terminal device with pre-specified gestures to generate a particular gesture information; identifying at least one activated application in active state; and performing preset commands corresponding to the particular gesture information for respective activated applications.

DETAILED DESCRIPTION

Some embodiments of the present disclosure provide a method and apparatus for executing a command on the basis of context awareness by recognizing gestures based on a sensor included in a terminal, executing such commands corresponding to particular gestures for respective activated applications at the same time, and thereby providing a gesture UI for performing a variety of context-based functions.

Hereinafter, at least one embodiment of the present disclosure will be described in detail with reference to the accompanying drawings.

Figure 1:
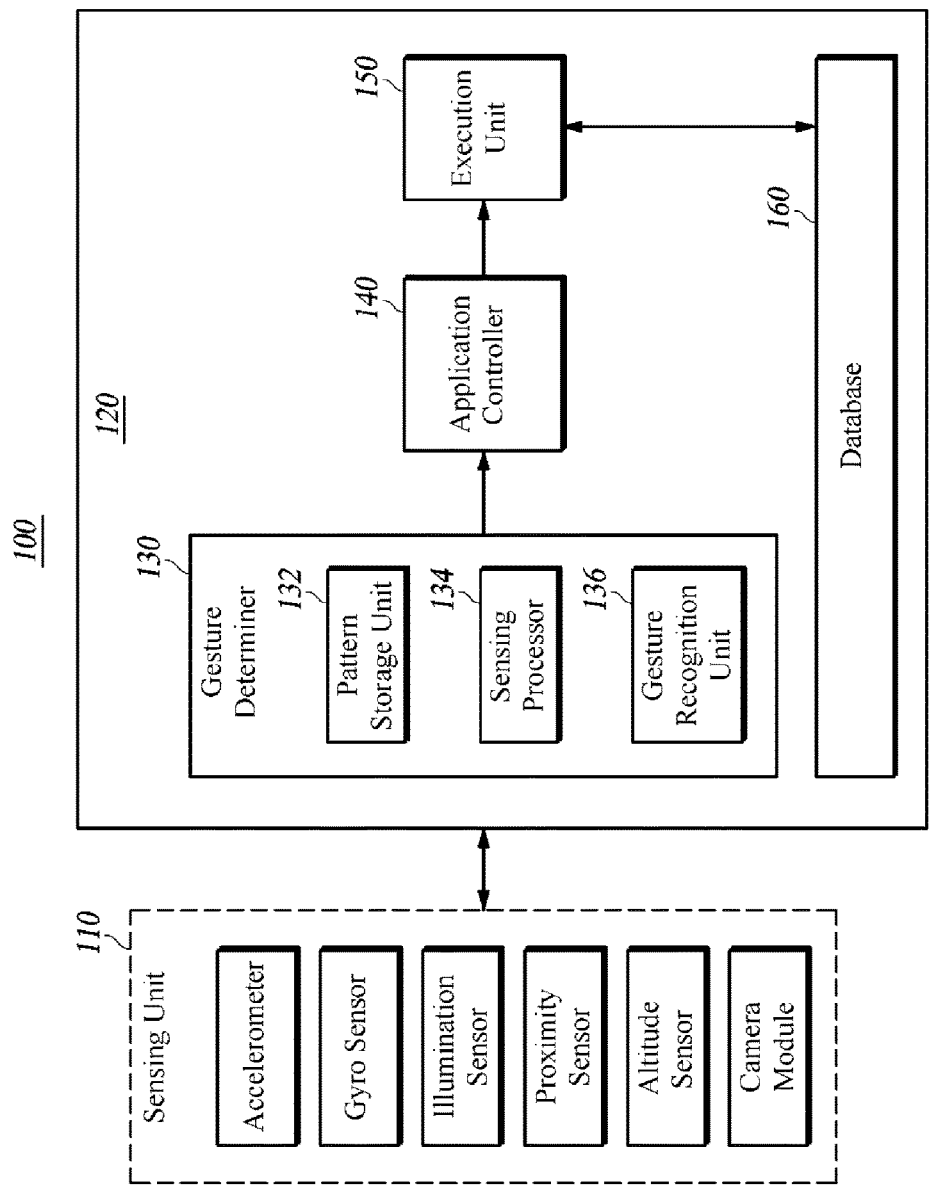
FIG. 1 is a schematic block diagram of a terminal device for executing a command on the basis of context awareness, according to at least one embodiment of the present disclosure.

FIG. 1 is a schematic block diagram of a terminal device (hereinafter, referred to as "terminal") for executing a command on the basis of context awareness, according to at least one embodiment of the present disclosure.

A terminal 100 for executing a command on the basis of context awareness according to one or more embodiments includes a sensing unit 110 and a context awareness unit 120. The elements included in the terminal 100 are not necessarily limited thereto. Each of the sensing unit 110 and the context awareness unit 120 is implemented by, or includes, one or more processors and/or application-specific integrated circuits (ASICs) specified for respectively corresponding operations and functions described herein.

The terminal 100 according to one or more embodiments refers to a user terminal device such as a PC (personal computer), laptop computer, tablet, PDA (personal digital assistant), game console, PMP (portable multimedia player), PSP (PlayStation Portable), wireless communication terminal, smartphone, TV, media player, and the like.

The terminal 100 according to one or more embodiments is various devices, each including (i) a communication device such as a communication modem or the like for performing communications with various types of devices, wired/wireless communication networks (e.g., the Internet, wireless personal area network (WPAN), wireless local area network (WLAN), WiBro (wireless broadband, aka WiMax) network), or mobile communication networks and the like or through various communication interfaces such as a cable, a universal serial bus (USB) and the like, (ii) a memory for storing various programs and data that perform various functions, and (III) a microprocessor to execute a program so as to perform calculation, operation and control, and the like. According to at least one embodiment, the memory includes a non-transitory computer-readable recording/storage medium such as a random access memory (RAM), a read only memory (ROM), a flash memory, an optical disk, a magnetic disk, a solid-state disk (SSD), and the like. According to at least one embodiment, the microprocessor is programmed for performing one or more of operations and/or functionality described herein. According to at least one embodiment, the microprocessor is implemented, in whole or in part, by specific purpose hardware (e.g., by one or more application specific integrated circuits or ASICs). The terminal 100 further comprises input units (not shown in FIG. 1) such as one or more buttons, a touch screen, a mic and so on, and output units (not shown in FIG. 1) such as a display, an indicator and so on.

The terminal 100 is equipped with a 'sensor manager,' a gesture UI application. The terminal 100 recognizes a gesture and executes a context-based command such that the command is transmitted to a corresponding application and executed by the application. The 'sensor manager' refers to a UI application for recognizing gestures using a sensor. The 'sensor manager' can be implemented as a software module.

Hereinafter, a method for equipping the terminal 100 with a sensor manager will be described. In case the terminal 100 is a smartphone, the sensor manager is able to be downloaded from an application service server and installed on the terminal 100. In case the terminal 100 is a feature phone, the sensor manager is able to be executed by a virtual machine (VM) downloaded from a server of a communications operator.

The sensor manager is embedded in the terminal 100 or embedded in an operating system (OS) provided in the terminal 100, or is installed on the OS in the terminal 100 by a user's manipulation or by way of a command. The sensor manager provided for the terminal 100 in the aforementioned manner may operate in conjunction with, but not limited to, default application programs installed in the terminal 100, e.g., a voice call application, an alarm application, a text (e.g., short message service (SMS), or multimedia messaging service (MMS)) application, a music player application, an image output application, a web browser application, a video player application, etc. The sensor manager, however, is operated independent of operatively connecting to the default application programs.

Hereinafter, description will be given of a procedure in which the terminal 100 uses the sensor manager to provide a gesture UI. The terminal 100 generates a motion change information by sensing a change in the user movement, compares the motion change information with prespecified gestures, and generates a particular gesture information. Thereafter, the terminal 100 identifies applications in the active state, generates an activated application information, and simultaneously executes preset commands, corresponding to the particular gesture information for respective activated applications.

Hereinafter, operation of the sensor manager will be described. The sensor manager is provided as an independent software function or hardware function that the terminal 100 performs, and thus is independently operated. Alternatively, the sensor manager is operatively linked to a software function or hardware function that the terminal 100 performs. The sensor manager provided for the terminal 100 operates well by using various kinds of hardware provided to the terminal 100. However, embodiments of the present disclosure are not limited thereto. The sensor manager is implemented by a separate device. In addition, the sensor manager operates in conjunction with application programs installed in the terminal 100.

Hereinafter, operations performed by the sensor manager will be described. The sensor manager installed in the terminal 100 generates the motion change information by sensing a change in the user's motion, compares the motion change information with prespecified gestures and then generates the particular gesture information. Thereafter, the sensor manager generates the activated application information by identifying applications in the active state, and simultaneously executes preset commands, corresponding to the particular gesture information for respective activated applications.

Hereinafter, elements included in the terminal 100 will be described.

The sensing unit 110 is a sort of module including a plurality of sensors configured to sense physical quantities such as heat, light, temperature, pressure and sound, or changes thereof. The sensing unit 110 generates the motion change information by detecting motions of the terminal 100 and sensing motion change(s) of the terminal 100. The sensing unit 110 detects each motion or sequential motions of the terminal 100 as the terminal 100, for example, moves backward and forward, or up and down, or in a clockwise or counterclockwise rotation, to thereby sense changes of movement of the terminal 100. That is the sensing unit 110 generates the motion change information based on data related to (i) the detected motion(s) of the terminal 100 and (ii) the sensed motion change(s) of the terminal. The sensing unit 110 includes an accelerometer, a gyro sensor, an illumination sensor, a proximity sensor, an altitude sensor, and a camera module. The proximity sensor includes a 'magnetic sensor', 'magnetic saturation sensor', 'inductive proximity switch', 'differential coil type switch', and 'capacitive sensor'. As an exemplary embodiment of the present disclosure, the sensing unit 110 is configured to be implemented as a single module included in the 'sensor manager.' As another exemplary embodiment of the present disclosure, the sensing unit 110 also is configured to be implemented as a separate module excluded from the 'sensor manager'.

The context awareness unit 120 compares the motion change information received from the sensing unit 110 with prestored gestures, generates the particular gesture information, and generates the activated application information by identifying applications which are in the active state. Herein, each of the prestored gestures is processed in a format of a digital image and in a directional pattern (e.g., type of curving and direction of rotation, from a start point to an end point, such as, for example, '↓', '↑', '↔', '←', '→', '↕', '↗', '↙', '↖', and '↘'), and thereafter stored, e.g., at a database or a non-transitory recordable medium, in a format of digitized data or electrical signals data. Thereafter, the context awareness unit 120 simultaneously executes preset commands, corresponding to the particular gesture information for respective activated applications. The context awareness unit 120 includes a gesture determiner 130, an application controller 140, an execution unit 150 and a database 160. Each of the gesture determiner 130, the application controller 140, the execution unit 150 is implemented by, or includes, one or more processors and/or application-specific integrated circuits (ASICs) specified for respectively corresponding operations and functions described herein in the present disclosure. The elements included in the context awareness unit 120 are not necessarily limited thereto.

The gesture determiner 130 compares the motion change information received from the sensing unit 110 with pre-specified gestures, and generates particular gesture information. Specifically, the particular gesture information is generated as follows. The gesture determiner 130 compares a displacement information included in the motion change information with patterns stored in a pattern storage unit 132, extracts a pattern having the highest matching rate with the motion change information, and recognizes information corresponding to the matched pattern as the particular gesture information.

The gesture determiner 130 includes the pattern storage unit 132, a sensing processor 134 and a gesture recognition unit 136. Each of the pattern storage unit 132, the sensing processor 134 and the gesture recognition unit 136 is implemented by, or includes, one or more processors and/or application-specific integrated circuits (ASICs) specified for respectively corresponding operations and functions described herein in the present disclosure. The pattern storage unit 132 stores the patterns. In other words, the pattern storage unit 132 stores at least one user gesture pattern. The user gesture pattern varies depending on the 2- or 3-dimensional directions, type of curving and direction of rotation thereof, from a start point to an end point. Such gesture patterns include patterns such as, for example, '↓', '↑', '↔', '←', '→', '↕', '↗', '↙', '↖', and '↘', but various other patterns are defined by the operator. The sensing processor 134 extracts coordinate values from the motion change information received from the sensing unit 110. The gesture recognition unit 136 calculates a position variance information on the user motion from the coordinate values, and recognizes a pattern having the highest matching rate by using the position variance information among the patterns prestored in the pattern storage unit 132, as the particular gesture information. Herein the highest matching rate can mean the rate of the highest matching in terms of direction, strength, length, etc of the gesture.

The application controller 140 generates the activated application information by identifying applications currently in the active state. The application controller 140 checks if multitasking is performed for the active applications. Once it confirms that the currently active applications are in a multitasking mode, the application controller 140 generates the activated application information which includes a multitasking information. If or when it determines that no multitasking is performed for the currently active applications, the application controller 140 generates the activated application information which includes a foreground information. Herein, the foreground refers to the execution of a process having a higher priority than other processes in multiprogramming. In this embodiment, the foreground also refers to information indicating the execution of a single application.

The execution unit 150 executes operation such that preset commands corresponding to the particular gesture information are executed for respective activated applications. The execution unit 150 transmits a command to an activated application corresponding to the activated application information so that an operation corresponding to the command is performed on the activated application. In addition, the execution unit 150 extracts, from the database 160, commands corresponding to activated application information and the particular gesture information.

If or when the multitasking information is included in the activated application information, the execution unit 150 causes context-based commands corresponding to particular gesture information to be simultaneously executed for at least two applications included in the multitasking information. If or when foreground information is included in the activated application information, the execution unit 150 executes a context-based command corresponding to particular gesture information with respect to an application corresponding to the foreground information.

The database 160 stores commands that matches a pattern for each of a plurality of applications. For example, the database 160, with respect to a same pattern, stores command A which corresponds to application A; stores command B which corresponds to application B; and stores command C which corresponds to application C. The database 160 is implemented as residing inside or outside the terminal 100. The database refers to a typical data structure implemented in a storage space (a hard disk or memory) of a computer system using database management system (DBMS). The database, which represents data storage capable of retrieving (extracting), deleting, editing and adding data, is implemented according to the purpose of some embodiments using, for example, Oracle, Infomix, Sybase, Relational Data Base Management System (RDBMS), Gemston, Orion, OODBMS, Excelon, Tamino, and Sekaiju.

Figure 2:
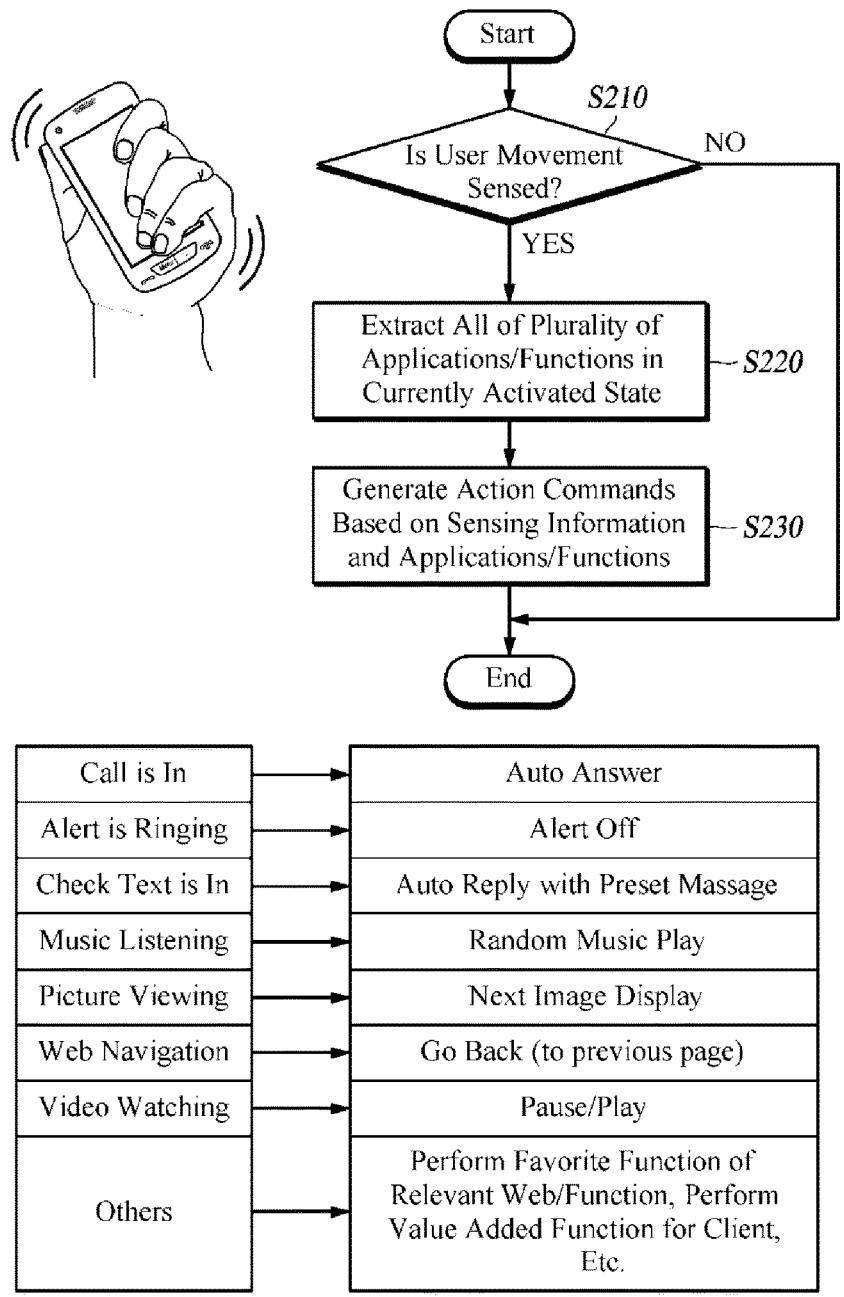
FIG. 2 is a flowchart of a method for executing a command on the basis of context awareness, according to at least one embodiment of the present disclosure.

FIG. 2 is a flowchart of a method for executing a command on the basis of context awareness, according to at least one embodiment of the present disclosure.

The terminal 100 checks if a movement of the particular terminal 100 is sensed, by comparing the motion change information with the pre-specified gestures (S210). At step S210, the terminal 100 checks for movement of the terminal 100 (or user) by using at least one of an accelerometer, a gyro sensor, an illumination sensor, a proximity sensor, an altitude sensor and a camera module. For example, when the user shakes the terminal 100, a gyro sensor included in the sensing unit 110 detects (or senses) the movement (or motion) introduced by the shaking of the terminal 100 and generates the motion change information based on the detected (or sensed) "shaking" motion of the terminal 100.

If or when a user movement (e.g., shaking motion of the terminal 100) is detected by using at least one of the accelerometer, gyro sensor, illumination sensor, proximity sensor, altitude sensor and camera module at step S210, the terminal 100 generates the activated application information by identifying applications currently in the active state (S220). At step S220, if or when the user movement (e.g., "shaking") is detected, the terminal 100 compares the motion change information with the prestored gestures and generate the particular gesture information for a gesture of the user recognized as the "shaking". In other words, the terminal 100 compares a displacement information included in the motion change information with patterns stored in the pattern storage unit 132 and extracts a matching pattern (e.g., '↕') having the highest matching rate (i.e., the matching pattern corresponds to a pattern (or directional motion) similar to or closest to the terminal's movement (or the user movement) extracted from patterns stored in the pattern storage unit 132. Thereby, the terminal 100 recognizes a shaking information corresponding to the matching pattern (↕) as the particular gesture information. Thereafter, the terminal 100 extracts all of the plurality of applications (or functions) which are currently in the active state.

The terminal 100 performs a control operation such that preset commands corresponding to the particular gesture information are executed for the respective activated applications (S230). The terminal 100 extracts preset commands corresponding to the particular gesture information for the respective activated applications from the database 160 storing commands that match a pattern for each of a plurality of applications, and then enables the extracted commands to be executed by corresponding applications. For example, the terminal 100 extracts 'command A' corresponding to 'shaking (↕)' from the database 160 and executes 'command A' with respect to 'application A'. In addition, the terminal 100 extracts 'command B' corresponding to 'shaking (↕)' from the database 160 and executes 'command B' with respect to 'application B'. In addition, the terminal 100 extracts 'command C' corresponding to 'shaking (↕) from the database 160 and executes 'command C' with respect to 'application C'.

Referring to FIG. 2 for example, the terminal 100 recognizes the user's gesture based on various installed sensors, convert a single gesture into specific context-based commands for respective applications and execute the commands while the user is using the terminal.

Additional descriptions will be given of an example gesture 'shake' (↕) with reference to step S230.

① If the terminal 100 detects a gesture 'shake' (↕) while, for example, reproducing a music by using a music player application (application A), the terminal 100 generates a command (command A) to automatically play a next piece or randomly selected piece of music. Thereafter, the terminal 100 executes the command (command A) with respect to the music player application (application A) to automatically play a next piece or randomly selected piece of music.

② If the terminal 100 detects the gesture 'shake' (↕) while, for example, an incoming call is ringing by using a voice call application (application B), the terminal 100 generates a command (command B) to automatically answer the call. Thereafter, the terminal 100 executes the command (command B) with respect to the voice call application (application B) for the user to automatically answer the call.

③ If the terminal 100 detects the gesture 'shake' (↕) while, for example, displaying an image by using an image display application (application C), the terminal 100 generates a command (command C) to automatically output the next image. Thereafter, the terminal 100 executes the command (command C) with respect to the image output application (application C) for the user to automatically output a next image.

④ If the terminal 100 detects the gesture 'shake' (↕) while, for example, a web browser is executed by using a web browser application (application D), the terminal 100 generates a command (command D) to perform a 'Go Back (to previous page)' function. Thereafter, the terminal 100 executes the command (command D) with respect to the web browser application (application D) for the user to perform the 'Go Back (to previous page)' function.

⑤ If the terminal 100 detects the gesture 'shake' (↕) while, for example, the user is watching a video by using a video player application (application E), the terminal 100 generates a command (command E) to perform a function of switching 'Play' to 'Pause' or 'Pause' to 'Play'. Thereafter, the terminal 100 executes the command (command E) with respect to the video player application (application E) for the user to switch 'Play' to 'Pause' or to switch 'Pause' to 'Play'.

⑥ If the terminal 100 has no more application in use or is in a standby mode, the terminal 100 performs an operation to execute a most frequently used application (or particular function) based on recent usage frequency of applications (or particular functions) or to execute a preset application (or particular function).

The user can execute various applications or functions by using only one hand, at least according to operations ① to ⑥ described above. Thereby, the usability of a terminal having a screen which is large for the user to operate with a single hand, may be enhanced, and various applications or functions can be automatically performed simply by an easy and simple movement of the user's hand or fingers. This enhanced usability translates into easy user manipulation.

Steps S210 to S230 have been described as being performed sequentially in the example shown in FIG. 2, but the present disclosure is not limited thereto. A person having ordinary skill in the pertinent art could appreciate that various modifications, additions, and substitutions are possible by changing the sequence described in FIG. 2 or by executing two or more steps thereof in parallel, and hence FIG. 2 is not limited to the illustrated chronological sequence.

The method for executing a command on the basis of context awareness according to at least one embodiment illustrated in FIG. 2 may be implemented by a program and recorded on a computer-readable recording medium. The computer-readable recording medium on which the program for implementing the method for executing a command on the basis of context awareness according to at least one embodiment is recorded includes all types of recording devices in which data readable by a computer system is stored.

Figure 3:
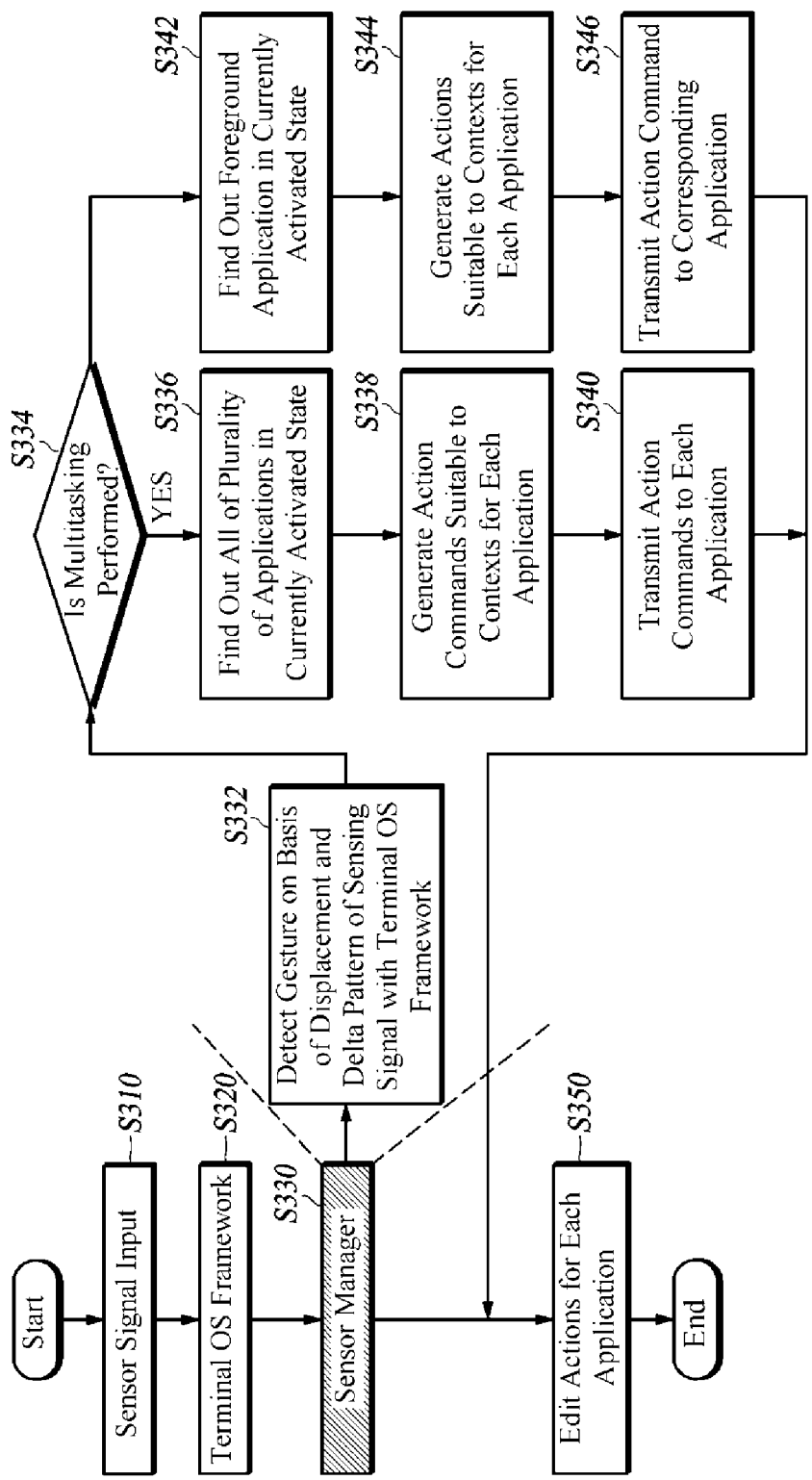
FIG. 3 is a flowchart of operations in response to events from a sensing unit according to at least one embodiment of the present disclosure.

FIG. 3 is a flowchart of operations in response to events from a sensing unit according to at least one embodiment of the present disclosure.

The terminal 100 receives a sensing signal from the sensing unit 110 (S310). At step S310, the terminal 100 receives a sensing signal from at least one of an accelerometer, a gyro sensor, an illumination sensor, a proximity sensor, an altitude sensor, and a camera module.

Motion change information is generated by sensing a change in the user movement based on the sensing signal received from the sensing unit 110 on a terminal OS framework of the terminal 100 (S320). The sensor manager of the terminal 100 compares the motion change information with pre-specified gestures and generates particular gesture information (S330). At step S330, the terminal 100 compares displacement information included in the motion change information with patterns prestored in the pattern storage unit 132, extracts a matching pattern having the highest matching rate, and recognizes information corresponding to the matching pattern as particular gesture information. For example, the gesture pattern may be one of '↓', '↑', '↔', '←', '→', '↕', '↗', '↙', '↖', and '↘'.

Hereinafter, step S330 will be described in more detail.

The terminal 100 detects particular gesture information on the basis of a displacement and a delta (Δ) pattern (prestored pattern) of the sensing signal by using the terminal OS framework (S332). The terminal 100 checks if multitasking is performed for applications which are currently being executed (S334). If step S334 confirms the currently executed applications are in multitasking, the terminal 100 checks information on all applications executed by multitasking (S336). At step S336, the terminal 100 finds all of a plurality of applications which are currently activated. For example, the terminal 100 confirms all applications of a 'music player application (application A)', a 'voice call application (application B)', an 'image output application (application C)', a 'web browser application (application D)' and a 'video player application (application E)', when they are currently executed by multitasking.

The terminal 100 generates commands according to a context of particular gesture information for respective applications (S338). For example, if the terminal 100 detects a gesture 'shake' (↕) while reproducing a music by using the music player application (application A), the terminal 100 generates a command (command A) to automatically play a next piece or randomly selected piece of music. At the same time, if the terminal 100 detects the gesture 'shake' (↕) while an incoming call is ringing by using the voice call application (application B), the terminal 100 generates a command (command B) to automatically answer the call. At the same time, if the terminal 100 detects the gesture 'shake' (↕) while displaying an image by using the image output application (application C), the terminal 100 generates a command (command C) to automatically display the next image. At the same time, if the terminal 100 detects the gesture 'shake' (↕) while the web browser is executed by using the web browser application (application D), the terminal 100 generates a command (command D) to perform a ' Go Back (to previous page)' function. At the same time, if the terminal 100 recognizes the gesture 'shake' (↕) while a user is watching a video by using the video player application (application E), the terminal 100 generates a command (command E) to perform a function of switching 'Play' to 'Pause' or 'Pause' to 'Play'.

Simultaneously generating commands corresponding to particular gesture information for each of a plurality of applications at step S338 means that the terminal 100 performs parallel processing of information according the plurality of applications.

The terminal 100 transmits commands to the applications, respectively (S340). For example, the terminal 100 transmits the command (command A) for the music player application (application A) to automatically play a next piece or randomly selected piece of music. At the same time, the terminal 100 transmits the command (command B) for the voice call application (application B) to automatically answer the call. At the same time, the terminal 100 transmits the command (command C) for the image output application (application C) to automatically output the next image. At the same time, the terminal 100 transmits the command (command D) for the web browser application (application D) to perform the ' Go Back (to previous page)' function. At the same time, the terminal 100 transmits the command (command E) for the video player application (application E) to perform a function of switching 'Play' to 'Pause' or 'Pause' to 'Play'.

Thereafter, the terminal 100 simultaneously and respectively executes the ' command to automatically play a next piece or randomly selected piece of music (command A)' by the 'music player application (application A)', 'command to automatically answer the call (command B)' by the 'voice call application (application B)', 'command to automatically output the next image (command C)' by the 'image output application (application C)', 'command to perform the "Go Back (to previous page)" function (command D)' by the 'web browser application (application D)', and 'command to perform a function of switching 'Play' to 'Pause' or 'Pause' to 'Play' '(command E)' by the 'video player application (application E)'.

The simultaneously and respectively executing of commands by the multiple applications at step S340 means that the terminal 100 executes a plurality of action information items in parallel.

If step S334 confirms no multitasking is performed for the currently executed applications, the terminal 100 finds a foreground application which is currently in the active state (S342). At step S342, the terminal 100 checks for a single application which is currently in the active state. For example, if the single application in active state is the 'music player application (application A)', the terminal 100 confirms the currently executed application is really the 'music player application (application A)'.

The terminal 100 generates action information items corresponding to contexts of particular gesture information for respective applications (S344). For example, when the terminal 100 recognizes a gesture 'shake' (↕) while reproducing music content using the music player application (application A), the terminal 100 generates a command (command A) to automatically play a next piece or randomly selected piece of music.

The terminal 100 transmits commands to corresponding applications (S346). For example, the terminal 100 transmits the command (command A) for the music player application (application A) to automatically play a next piece or randomly selected piece of music. Thereafter, the terminal 100 executes the command (command A) with respect to the 'music player application (application A)' and 'voice call application (application B)'.

Steps S310 to S346 have been described as being performed sequentially in the example shown in FIG. 3, but the present disclosure is not limited thereto. A person having ordinary skill in the pertinent art could appreciate that various modifications, additions, and substitutions are possible by changing the sequence described in FIG. 3 or by executing two or more steps thereof in parallel, and hence FIG. 3 is not limited to the illustrated chronological sequence.

An operation for an event generated from the sensing unit according to at least one embodiment illustrated in FIG. 3 may be implemented by a program and recorded on a computer-readable recording medium. The computer-readable recording medium on which the program for implementing an operation for an event generated from the sensing unit is recorded includes all types of recording devices in which data readable by a computer system is stored.

Figure 4:
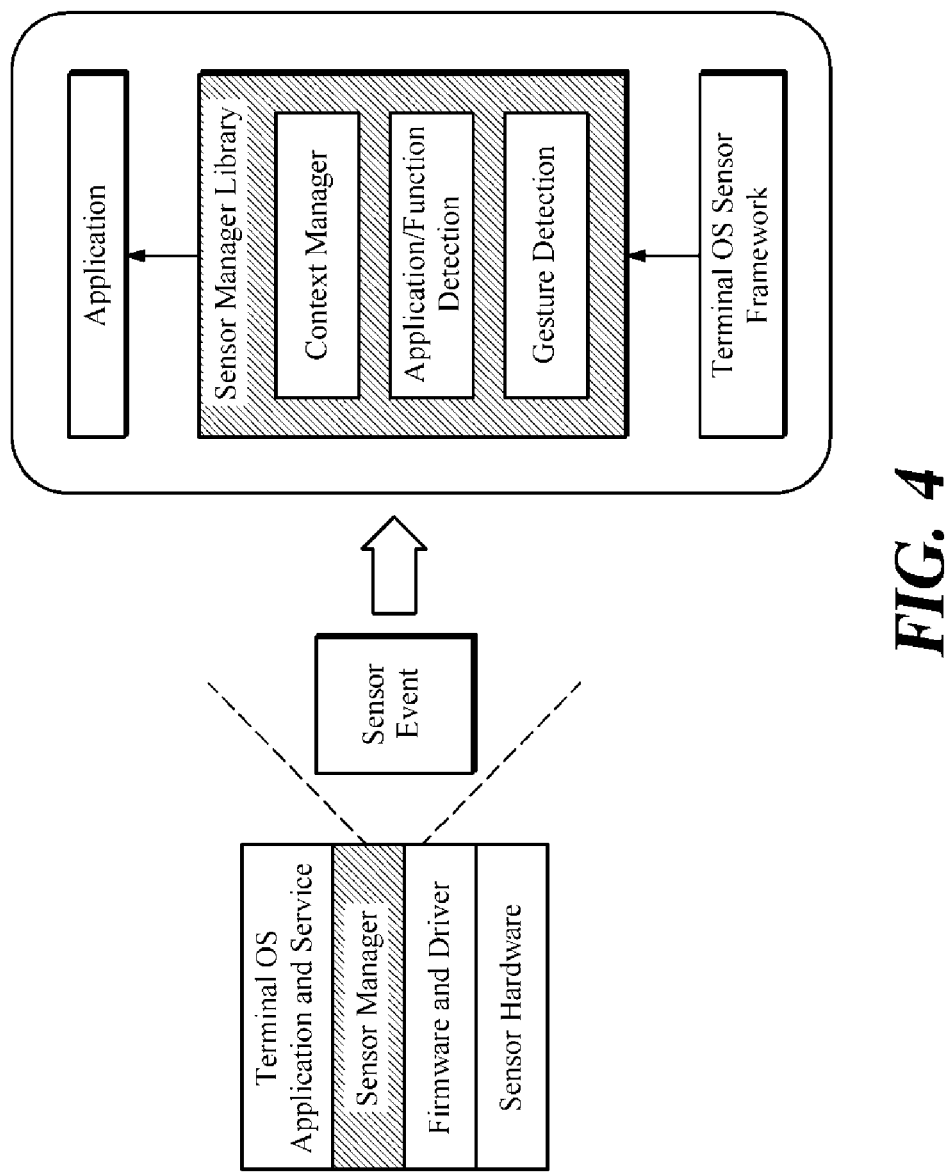
FIG. 4 is a diagram of a sensor manager module according to at least one embodiment of the present disclosure.

FIG. 4 is a diagram of a sensor manager module according to at least one embodiment of the present disclosure.

The terminal 100 includes 'terminal OS application and service', 'sensor manager', 'firmware and driver' and 'sensor hardware'. As shown in FIG. 4, when a 'sensor event' is detected, the 'sensor manager' generates motion change information from sensing a change in the user's motion by using a 'sensor manager library', which includes a 'context manager', an 'application/function detector' and a 'gesture detector', compares the motion change information with pre-specified gestures, and generates particular gesture information. The 'sensor manager' generates the activated application information by identifying applications in the active state, and executes preset commands corresponding to the particular gesture information for the respective activated applications.

The 'terminal OS sensor framework' transmits, to the 'sensor manager library', the particular gesture information on the basis of the motion change information, and the 'sensor manager library' transmits commands to the 'applications'.

The sensing unit 110 of the terminal 100 basically includes an accelerometer, a gyro sensor, an illumination sensor, a proximity sensor, a camera module and an altitude sensor. With the sensors included in the sensing unit 110, a user movement may be detected. The user movement (gesture) is not a kind of UI that is displayed on the screen of the terminal 100, and accordingly increased number of kinds of user movements (gestures) may rather impair usability.

The present disclosure is focused on converting one particular user movement (gesture) into various commands to be performed according to contexts of the user, and the user does not need to remember multiple user movements (gestures). Therefore, the present disclosure is able to provide advantageous effects in terms of consistency and convenience for the user.

Hereinafter, description will be given on an illustrative user movement (gesture) "shake". To accurately detect a user movement (gesture) "shake" that the user does intentionally, the sensing unit 110 uses not only changing values measured by sensors, but also a pattern of the changing values. This operation prevents the sensing unit 110 from incorrectly operating in response to casual movements such as a user's involuntary movement.

Once the user movement (gesture) of shaking is recognized, the sensing unit 110 transmits a corresponding signal to a processor. The processor finds a specific displacement value of the movement by using a sensor framework of a terminal OS (e.g., Android). If or when the processor determines the user movement (gesture) of shaking from the displacement value, the processor sends an event for the user movement (gesture) to the 'sensor manager' software according to at least one embodiment of the present disclosure.

Once the 'sensor manager' receives the event generated in the sensing unit 110, the 'sensor manager' finds applications which the user is currently using, and then sends, to a corresponding application, a command event for 'function execution' suitable for the user movement (gesture) "shaking", and the corresponding application receives the command event and performs a corresponding function.

For example, an 'application/function detector' recognizes a gesture 'shake' ($\updownarrow$) through a 'gesture detector' while music content is reproduced using a music player application (application A), a 'context manager' generates a command (command A) to automatically play a next piece or randomly selected piece of music. Thereafter, the 'context manager' executes the command (command A) with respect to the music player application (application A).

If or when the 'application/function detector' recognizes the gesture 'shake' ($\updownarrow$) through the 'gesture detector' while an incoming call is ringing by using a voice call application (application B), the 'context manager' generates a command (command B) to automatically answer the call. Thereafter, the 'context manager' executes the command (command B) with respect to the voice call application (application B).

If or when the 'application/function detector' recognizes the gesture 'shake' ($\updownarrow$) through the 'gesture detector' while an image is output using an image output application (application C), the 'context manager' generates a command (command C) to automatically output the next image. Thereafter, the 'context manager' executes the command (command C) with respect to the image output application (application C).

If or when the 'application/function detector' recognizes the gesture 'shake' ($\updownarrow$) through the 'gesture detector' while web browser is executed by using a web browser application (application D), the 'context manager' generates a command (command D) to perform the ' Go Back (to previous page)' function. Thereafter, the 'context manager' executes the command (command C) with respect to the web browser application (application D).

If or when the 'application/function detector' recognizes the gesture 'shake' ($\updownarrow$) through the 'gesture detector' while a user is watching a video by using a video player application (application E), the 'context manager' generates a command to perform a function of switching 'Play' to 'Pause' or 'Pause' to 'Play'. Thereafter, the 'context manager' executes the command (command E) with respect to the video player application (application E).

In other words, the concept of a context awareness-based user movement (gesture) UI to perform various functions based on contexts for the user can be implemented with a single gesture ($\updownarrow$).

The main functions of the 'sensor manager' are summarized below. The 'sensor manager' implemented by software determines a user movement (gesture) by using a pattern of changes in a signal value generated from the sensing unit 110, converts the user movement (gesture) into a function execution command and transmits the command.

The 'sensor manager' may include a module (e.g., the sensing unit 110) configured to determine a user movement (gesture) by using a pattern of changes of a sensor data value, a module (e.g., the application controller 140) configured to identify an application in use, and a module (e.g., the execution unit 150) configured to convert the user's movement (gesture) into a proper function execution command according to context and transmit the command.

According to various embodiments of the present disclosure as described above, gestures are recognized based on a sensor included in a terminal device, and commands corresponding to particular gestures for corresponding applications are executed at the same time. Thereby, a gesture UI for performing a variety of context-based functions can be provided.

According to various embodiments of the present disclosure, rather than operating only one application based on the movements of the user of the terminal device, the present disclosure can simultaneously execute multiple commands for one or more applications activated currently on the terminal device according to a particular gesture of the user.

According to various embodiments of the present disclosure, a single gesture can be used after being converted into such commands as appropriate to currently activated multiple applications. This enables one or two simple gestures to perform various functions for multiple applications respectively, resulting in enhanced usability.

According to various embodiments of the present disclosure, when the size of the screen of the terminal is too large to manipulate with one hand, using the gesture UI can ensure that the terminal device is smoothly controlled with one hand. In other words, various functions can be readily performed using a single hand, and thus usability of a product having a large screen may be enhanced, and various context-based functions can be conveniently performed by use of one simple movement.

According to various embodiments of the present disclosure, one particular movement (gesture) of the user is able to be converted into multiple various commands to be executed according to the user context, obviating the need for the user to get used to many gestures.

As described above, a method for executing a command on the basis of context awareness according to at least one embodiment of the present disclosure is implemented by simply modifying a protocol in software without a modification in hardware. Accordingly, the method for executing a command on the basis of context awareness according to at least one embodiment of the present disclosure can also be implemented as computerreadable code on a non-transitory computer readable recording medium. The non-transitory computerreadable recording medium is any data storage device that can store data which can be thereafter read by a computer system. Examples of the non-transitory computer readable recording medium include magnetic storage media (e.g., a magnetic tape, a floppy disk, a hard disk, etc.), optical recording media (e.g., a compact disk read only memory (CD-ROM) and a digital video disk (DVD), etc.)), magneto-optical media (e.g., a floptical disk, and hardware devices that are specially configured to store and execute program instructions, such as a ROM, a random access memory (RAM), a flash memory, etc.).

Although exemplary embodiments of the present disclosure have been described for illustrative purposes, those who have ordinary skill in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

The invention claimed is:

1. A terminal device, comprising:
   a sensing unit configured to generate a motion change information by detecting motions of the terminal device and sensing a motion change of the terminal device; and
   a gesture determiner configured to
      compare the motion change information with pre-specified gestures and
      generate a particular gesture information corresponding to the sensed motion change of the terminal device, wherein each gesture corresponding to the sensed motion change of the terminal device has been respectively pre-specified to respective preset commands for two or more applications;
   wherein in order to generate different activated application information and execute the respective preset commands corresponding to a particular gesture of the sensed motion change according to whether the applications in an active state support a multitasking mode or not, the terminal device further comprises:
   an application controller configured to
      identify the applications in the active state,
      determine whether the applications in the active state support the multitasking mode, and
      generate, when the applications in the active state support the multitasking mode, an activated application information including multitasking information, or generate, when the applications in the active state are determined not to support the multitasking mode, another activated application information including foreground information; and
   an execution unit configured to simultaneously and respectively execute the respective preset commands corresponding to the particular gesture information for the applications, which are indicated by the multitasking information, in the active state in response to the activated application information.

2. The terminal device of claim 1, wherein the execution unit is configured to further execute the preset command corresponding to the particular gesture information for an application, which is indicated by the foreground information, in the active state in response to the another activated application information.

3. The terminal device of claim 1, wherein the gesture determiner is configured to
   compare a displacement information included in the motion change information with prestored patterns,
   extract a matching pattern having a highest matching rate with the motion change information, and
   recognize information corresponding to the matching pattern as the particular gesture information.

4. The terminal device of claim 1, wherein the gesture determiner comprises:
   a pattern storage unit configured to have prestored patterns;
   a sensing processor configured to extract coordinate values from the motion change information; and
   a gesture recognition unit configured to
      calculate position variance information from the coordinate values and
      recognize a matching pattern having a highest matching rate with the position variance information among the prestored patterns, as the particular gesture information.

5. The terminal device of claim 1, wherein the execution unit is configured to transmit the commands to the activated application such that operations corresponding to the commands are performed on the activated applications.

6. The terminal device of claim 1, further comprising
   a database configured to store a command matching one pattern for each of a plurality of applications,
   wherein the execution unit extracts the commands corresponding to the activated applications and the particular gesture information from the database.

7. The terminal device of claim 1, wherein the foreground information refers to the execution of a process having a higher priority than other processes.

8. A non-transitory computer readable medium containing a program for executing a command on the basis of context awareness, and the program including computer-executable instructions for causing, when executed by a data processor, the data processor to execute:
   detecting motions of the terminal device and sensing a motion change of the terminal device;
   generating the motion change information based on the sensed motion change of the terminal device;
   determining a gesture by
      (i) comparing the motion change information of the terminal device with pre-specified gestures and
      (ii) generating a particular gesture information corresponding to the sensed motion change of the terminal device, wherein each gesture corresponding to the sensed motion change of the terminal device has been respectively pre-specified to respective preset commands for simultaneously and respectively performing two or more applications in a multitasking mode;
identifying applications in an active state;
determining whether the applications in the active state support a multitasking mode;
generating, when the applications in the active state support the multitasking mode, an activated application information including multitasking information, or generating, when the applications in the active state are determined not to support the multitasking mode, another activated application information including foreground information; and
simultaneously and respectively executing the respective preset commands corresponding to the particular gesture information for the applications, which are indicated by the multitasking information, in the active state in response to the activated application information.

9. The non-transitory computer readable medium of claim 8,
further executing the preset command corresponding to the particular gesture information for an application, which is indicated by the foreground information, in the active state in response to the another activated application information.

10. A method performed by a terminal device for executing a command on the basis of context awareness, the method comprising:
detecting motions of the terminal device and sensing a motion change of the terminal device;
generating the motion change information based on the sensed motion change of the terminal device;
determining a gesture by
(i) comparing the motion change information of the terminal device with pre-specified gestures and
(ii) generating a particular gesture information corresponding to the sensed motion change of the terminal device, wherein each gesture corresponding to the sensed motion change of the terminal device has been respectively pre-specified to respective preset commands for simultaneously and respectively performing two or more applications in a multitasking mode;
identifying applications in an active state;
determining whether the applications in the active state support a multitasking mode;
generating, when the applications in the active state are determined to support the multitasking mode, an activated application information including multitasking information, or generating, when the applications in the active state are determined not to support the multitasking mode, another activated application information including foreground information; and
performing the preset commands corresponding to the particular gesture information for the applications, which are indicated by the multitasking information, in the active state in response to the activated application information.

11. The method of claim 10, wherein the method comprises:
further performing the preset command corresponding to the particular gesture information for an application, which is indicated by the foreground information, in the active state in response to the another activated application information.

* * * * *